(12) United States Patent
Hirayama

(10) Patent No.: US 7,295,923 B2
(45) Date of Patent: Nov. 13, 2007

(54) NAVIGATION DEVICE AND ADDRESS INPUT METHOD THEREOF

(75) Inventor: Yoshikazu Hirayama, Kanagawa (JP)

(73) Assignee: Xanavi Informatics Corporation, Zama-Shi (JP)

( * ) Notice: Subject to any disclaimer, the term of this patent is extended or adjusted under 35 U.S.C. 154(b) by 0 days.

(21) Appl. No.: 11/688,520

(22) Filed: Mar. 20, 2007

(65) Prior Publication Data
US 2007/0244629 A1 Oct. 18, 2007

(30) Foreign Application Priority Data
Apr. 17, 2006 (JP) .............................. 2006-113645

(51) Int. Cl.
*G01C 21/30* (2006.01)
(52) U.S. Cl. ........................ 701/209; 701/208; 701/211
(58) Field of Classification Search ........ 701/200–213; 240/995.12–995.27
See application file for complete search history.

(56) References Cited
U.S. PATENT DOCUMENTS 7,263,438 B2 * 8/2007 Furukawa ................... 701/200
7,266,447 B2 * 9/2007 Bauer et al. ................. 701/208

FOREIGN PATENT DOCUMENTS
JP 2003-140682 5/2003

* cited by examiner

*Primary Examiner*—Richard M. Camby
(74) *Attorney, Agent, or Firm*—Antonelli, Terry, Stout & Kraus, LLP.

(57) ABSTRACT

Voice input of an address, which is user-friendly and has improved recognition result accuracy. First, a whole street name (full name) is uttered and voice recognition is tried. Only if the voice recognition fails, at least one letter of a character string expressing the street name is uttered, and the letter is used to narrow down candidates for the street name.

6 Claims, 9 Drawing Sheets

FIG. 8

"PLEASE SAY THE 1ST LETTER OF THE STREET NAME"

⇩ THE USER SAYS "M".

VOICE RECOGNITION AND RELIABILITY CALCULATION

| LETTER (51) | RELIABILITY (52) |
|---|---|
| A | * * |
| B | * * |
| C | * * |
| ⋮ | ⋮ |
| M | * * |
| N | * * |
| ⋮ | ⋮ |
| Z | * * |

⇩

EXTRACTION OF LETTERS HAVING RELIABILITY HIGHER THAN OR EQUAL TO A PREDETERMINED VALUE

⇩ EXTRACTION OF M AND N

EXTRACTION OF STREET NAMES BEGINNING WITH M OR N

⇩

| CANDIDATES |
|---|
| MAIN ST |
| MAX AVE |
| ⋮ |
| NAB AVE |
| NCD ST |
| NEF ST |
| ⋮ |

FIG. 10

(e') 
TEXAS
HOUSTON
MAIN ST
P — ①②③④ PLEASE SAY THE CORRECT LETTER WHILE DESIGNATING ITS POSITION.

⬇ "THE 2ND LETTER TO A"

(f')
TEXAS
HOUSTON
MA__

PLEASE SAY THE STREET NAME.

⬇

(g')
TEXAS
HOUSTON
MAIN ST

OK

NAVIGATION DEVICE AND ADDRESS INPUT METHOD THEREOF

FIELD OF THE INVENTION

The present invention relates to a navigation device and an address input method therefor.

BACKGROUND OF THE INVENTION

An address comprises a state name, a city name and a street name. Thus, some navigation devices receive voice input of address elements in the order of: a state name, a city name and a street name, in order to specify a site (See Japanese Un-examined Patent Application, Laid-Open No. 2003-140682, which is hereinafter referred to as Patent Document 1). On the other hand, considering cases where a vast number of streets exist, some navigation devices request a user to utter two letters of a street name first. In detail, a user is invited to utter up to the second letter of a the street name, and those two uttered letters are recognized. Candidates for two recognized letters are displayed. Among the candidates, the user is invited to select two letters by voice, and street names beginning with the selected two letters are made candidates. Then, the user utters the whole name (the full name) of the street, and, among the candidates for the street name, one that best matches the utterance is extracted as the recognition result.

SUMMARY OF THE INVENTION

In the above-described technique, a user must perform two steps each time, uttering two letters first and then uttering the whole name (full name) of the street. This is not user-friendly.

The present invention has been made to solve the above problem. Thus, an object of the invention is to improve the usability for a user and the accuracy of the recognition result.

According to the present invention, to solve the above problem, a user first has to utter the whole name (the full name) of the street, and voice recognition of the uttered street name is tried. Only if the recognition fails, the user has to utter at least one letter of the street name, to narrow down candidates for the street name.

In a first aspect of the present invention, a navigation device comprises: a storage means, which stores street names; a first street name receiving means, which receives voice input of a whole street name; a first street name specifying means, which specifies a street name that best matches the voice received by the first street name receiving means among the street names stored in the storage means; a confirmation means, which receives confirmation of the street name specified by the first street name specifying means; a letter receiving means, which receives voice input of at least one letter from a character string expressing the street name specified by the first street name specifying means, when the confirmation means has not received confirmation of the specified street name; a letter specifying means, which recognizes the voice input received by the letter receiving means, so as to specify a letter; an extraction means, which extracts candidate street names from the street names stored in the storage means, by using the letter specified by the letter specifying means; a second street name receiving means, which receives voice input of the whole street name after the letter receiving means receives the voice input; a second street name specifying means, which specifies a street name that best matches the voice input received by the second street name receiving means, from among the street names extracted by the extraction means; and an output means, which outputs the street name specified by the second street name specifying means.

In a second aspect of the present invention a navigation device comprises: a storage means, which stores street names; a first street name receiving means, which receives voice input of a whole street name; a first street name specifying means, which specifies a street name that best matches the voice input received by the first street name receiving means, from among the street names stored in the storage means; a confirmation means, which receives confirmation of the street name specified by the first street name specifying means; a letter receiving means, which receives voice input of a first letter of a street name when the confirmation means has not received confirmation of the specified street name; a letter specifying means, which recognizes the voice input received by the letter receiving means, so as to specify a letter; an extraction means, which extracts street names beginning with the letter specified by the letter specifying means, from the street names stored in the storage means; a second street name receiving means, which receives voice input of the whole street name after the letter receiving means receives the voice input; a second street name specifying means, which specifies a street name that best matches the voice input received by the second street name receiving means, from among the street names extracted by the extraction means; and an output means, which outputs the street name specified by the second street name specifying means.

In a third aspect of the present invention a navigation device comprises: a storage means, which stores street names by state name and city name; a state name receiving means, which receives voice input of a state name; a state name specifying means, which recognizes the voice input received by the state name receiving means, so as to specify a state name; a city name receiving means, which receives voice input of a city name; a city name specifying means, which specifies a city name that belongs to the state name specified by the state name specifying means and best matches the voice input received by the city name receiving means; a first street name receiving means, which receives voice input of a street name; a first street name specifying means, which specifies a street name that belongs to the city name specified by the city name specifying means and best matches the voice input received by the first street name receiving means among the street names stored in the storage means; a confirmation receiving means, which receives confirmation of the street name specified by the first street name specifying means; a letter receiving means, which receives voice input of a first letter of a street name when the confirmation receiving means has not received confirmation of the specified street name; a letter specifying means, which recognizes the voice input received by the letter receiving means, so as to specify a letter; a street name extraction means, which extracts street names that belong to the city name specified by the city name specifying means and begin with the letter specified by the letter specifying means, from among the street names stored in the storage means; a second street name receiving means, which receives voice input of the whole street name after the letter receiving means receives the voice input; a second street name specifying means, which specifies a street name that best matches the voice input received by the second street name receiving means, from among the street names extracted by the street name extraction means; and an output means, which outputs the street name specified by the second street name specifying means.

A fourth aspect of the present invention provides a navigation device, comprising: a storage means, which stores street names; a first street name receiving means, which receives voice input of a whole street name; a first street name specifying means, which specifies a street name that best matches the voice input received by the first street name receiving means, from among the street names stored in the storage means; a confirmation means, which receives confirmation of the street name specified by the first street name specifying means; a letter receiving means, which receives, by voice input, a correct letter to replace a wrong letter in a character string expressing the street name specified by the first street name specifying means, together with a position of the wrong letter in the character string, when the confirmation means has not received confirmation of the specified street name; a letter specifying means, which recognizes the voice input received by the letter receiving means, so as to specify the correct letter; a character string acquisition means, which acquires, from a character string that expresses the street name specified by the first street name specifying means, a character string extending as far as the correct letter in a character string resulting from replacing the wrong letter by the correct letter; an extraction means, which extracts street names beginning with the acquired character string, from among the street names stored in the storage means; a second street name receiving means, which receives voice input of the whole street name after the letter receiving means receives the voice input; a second street name specifying means, which specifies a street name that best matches the voice input received by the second street name receiving means, from among the street names extracted by the extraction means; and an output means, which outputs the street name specified by the second street name specifying means.

The letter specifying means may obtain reliability for each alphabetical letter from the voice input received by the letter receiving means and extract a letter having reliability higher than or equal to a predetermined value.

BRIEF DESCRIPTION OF THE DRAWINGS

FIG. 8 is a diagram for explaining confirmation of candidates for a street name;

FIG. 10 is a view showing an example of display screen transition in the modified embodiment.

DETAILED DESCRIPTION OF THE PREFERRED EMBODIMENTS

Figure 1:
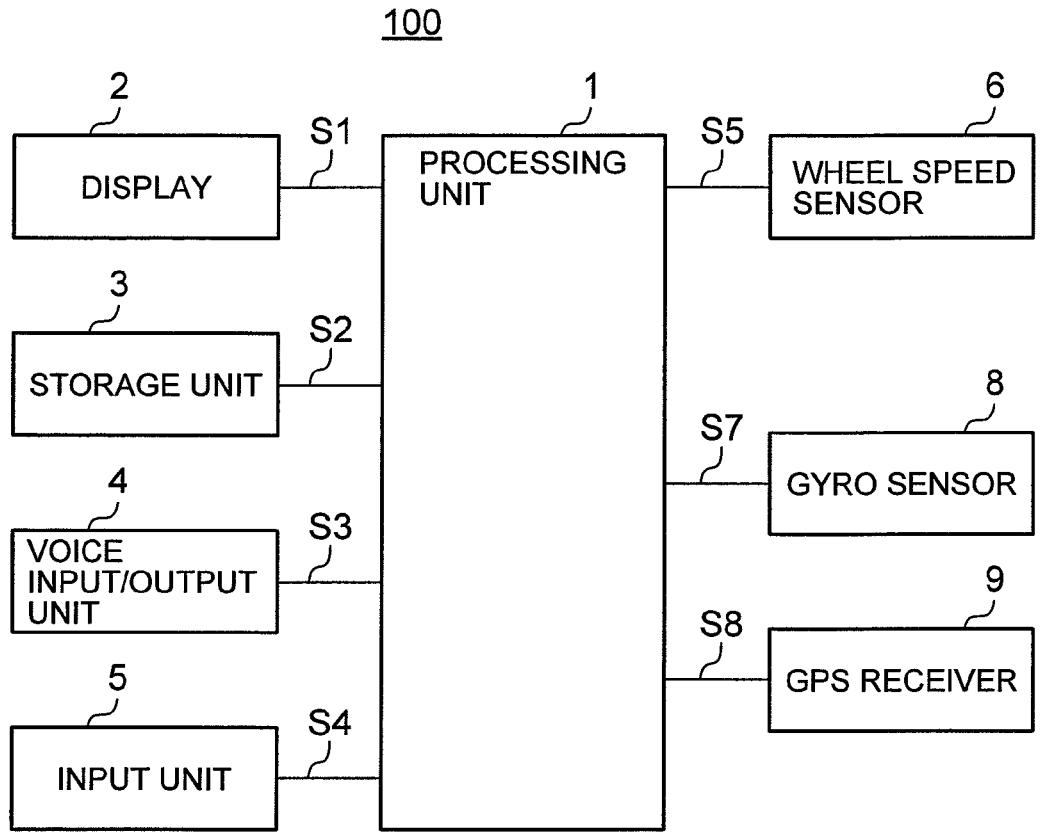
FIG. 1 is a schematic block diagram showing a vehicle navigation device to which one embodiment of the present invention is applied.

Below, one embodiment of the present invention will be described referring to the drawings.

FIG. 1 is a schematic block diagram showing a vehicle navigation device 100 to which one embodiment of the present invention is applied. As shown in the figure, the vehicle navigation device 100 comprises a processing unit 1, a display 2, a storage unit 3, a voice input/output unit 4, an input unit 5, a wheel speed sensor 6, a gyro sensor 8, and a Global Positioning System (GPS) receiver 9.

The processing unit 1 is a central unit that performs various kinds of processing. For example, the processing unit 1 detects the present location based on pieces of information outputted from the various sensors 6-8 and the GPS receiver 9. Further, the processing unit 1 recognizes voice inputted through the voice input/output unit 4 and specifies the content of the user's input on the basis of the recognized words.

The display 2 is a unit for displaying graphics information generated by the processing unit 1.

Figure 2:
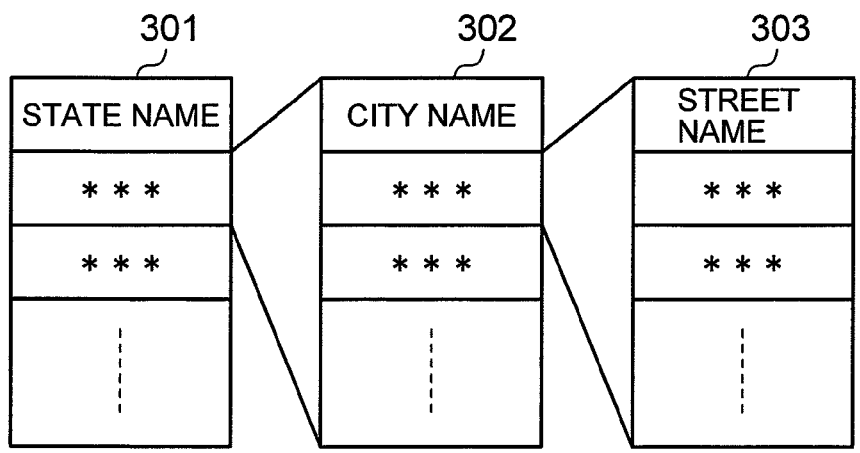
FIG. 2 is a diagram showing an example of a configuration of an address database.

The storage unit 3 comprises a storage medium such as a CD-ROM, a DVD-ROM, an HDD or an IC card. This storage medium stores an map data and an address database. FIG. 2 shows an example of a configuration of the address database 300. As shown in the figure, the address database 300 stores state names 301, city names 302 and street names 203 in a hierarchical structure.

The voice input/output unit 4 is provided with a microphone for acquiring user utterances, to be sent to the processing unit 1. Further, the voice input/output unit 4 converts a message for the user, which has been generated by the processing unit 1, into a voice signal and outputs the voice signal.

The input unit 5 is a unit for receiving an instruction from the user. The input unit 5 comprises hard switches such as scroll keys and a scale key, a joystick, a touch panel stuck on the display, and the like.

The sensors 6 to 8 and the GPS receiver 9 are used in the vehicle navigation device 100 for detecting the present location (i.e. the location of the vehicle on which the navigation device is mounted).

Figure 3:
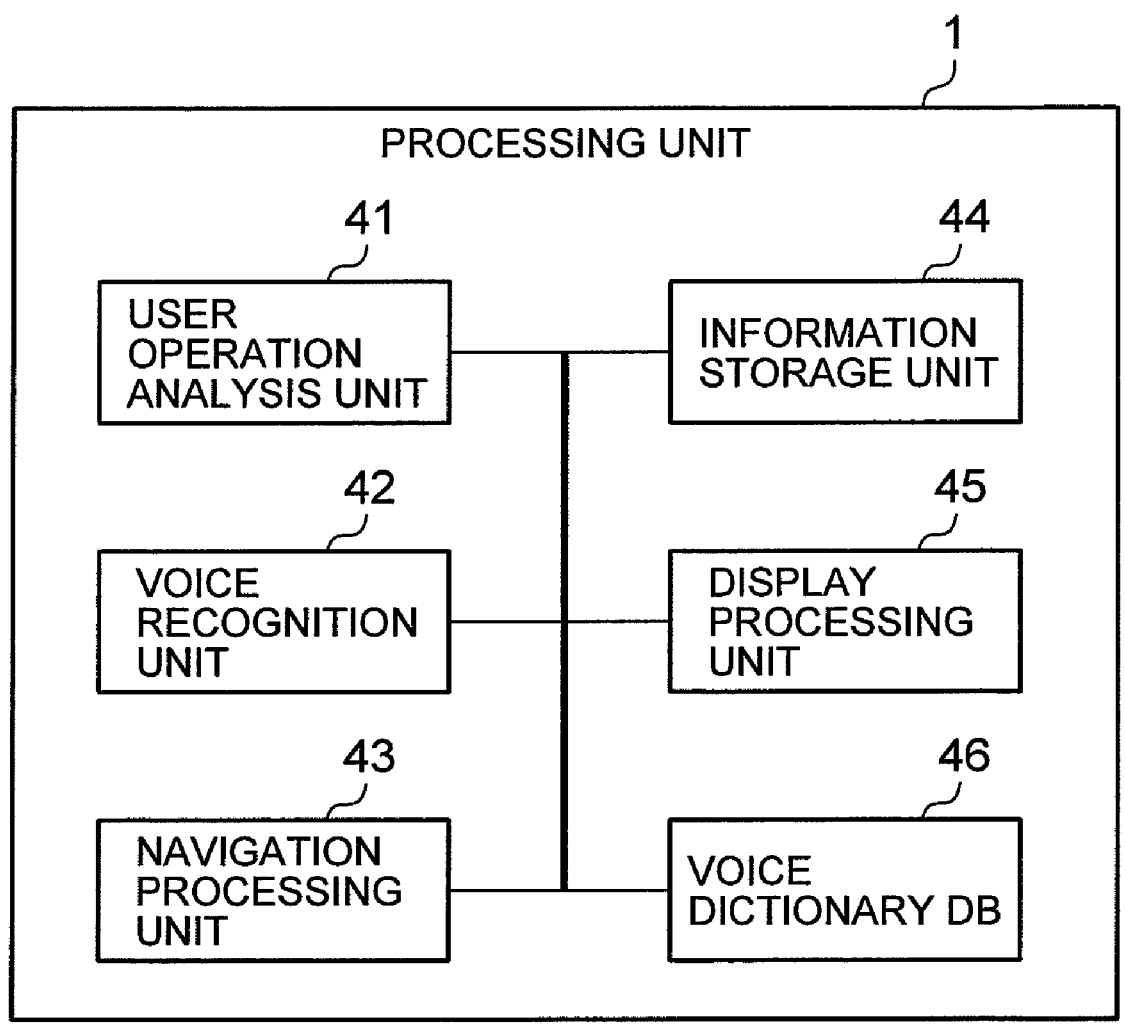
FIG. 3 is a diagram showing a functional configuration of a processing unit 1.

FIG. 3 is a functional block diagram showing the processing unit 1.

As shown in the figure, the processing unit 1 comprises a user operation analysis unit 41, a voice recognition unit 42, a navigation processing unit 43, an information storage unit 44, a display processing unit 45, and a voice dictionary database 46.

The user operation analysis unit 41 receives a user's request inputted through the input unit 5, analyzes the content of the request, and controls the various components of the processing unit 1 to perform processing corresponding to the content of the request. In addition, the user operation analysis unit 41 analyzes a user's request (a command) on the basis of words that have been inputted through the voice input/output unit 4 and recognized by the voice recognition unit 42, and controls the various components of the processing unit 1 to perform processing corresponding to the content of the request.

The voice recognition unit 42 acquires the user's utterance through the voice input/output unit 4. Then, the voice recognition unit 42 recognizes the acquired utterance using the voice dictionary database 46, and specifies the phrase (word or words) uttered by the user. For example, when the user utters an address (a state, a city and a street) in order to specify a site, then the state, the city and the street are recognized based on the utterances of the user. As a method of voice recognition for recognizing words from the utterance, a conventional method can be used. For example, a method using the Dynamic Programming (DP) matching method or a method using the HiddenMarkovModel (HMM) may be employed. The voice dictionary database 46 stores voice models (which are required for voice recognition) in association with respective phrases.

The navigation processing unit 43 finds the present location on the basis of output of the various sensors 6-8 and the GPS receiver 9, and searches for a recommended route that connects two designated sites (the present location and a destination). Further, the navigation processing unit 43 displays the recommended route on the display 2 and performs route guidance.

The information storage unit 44 stores words recognized by the voice recognition unit 42 and information on the site retrieved by the navigation processing unit 43.

The display processing unit 45 generates drawing commands for the display 2. For example, the display processing unit 45 generates map drawing commands in order to draw roads and other map elements, the present location, the destination, and marks such as arrows indicating the recommended route, using a designated scale and a designated drawing method.

Figure 4:
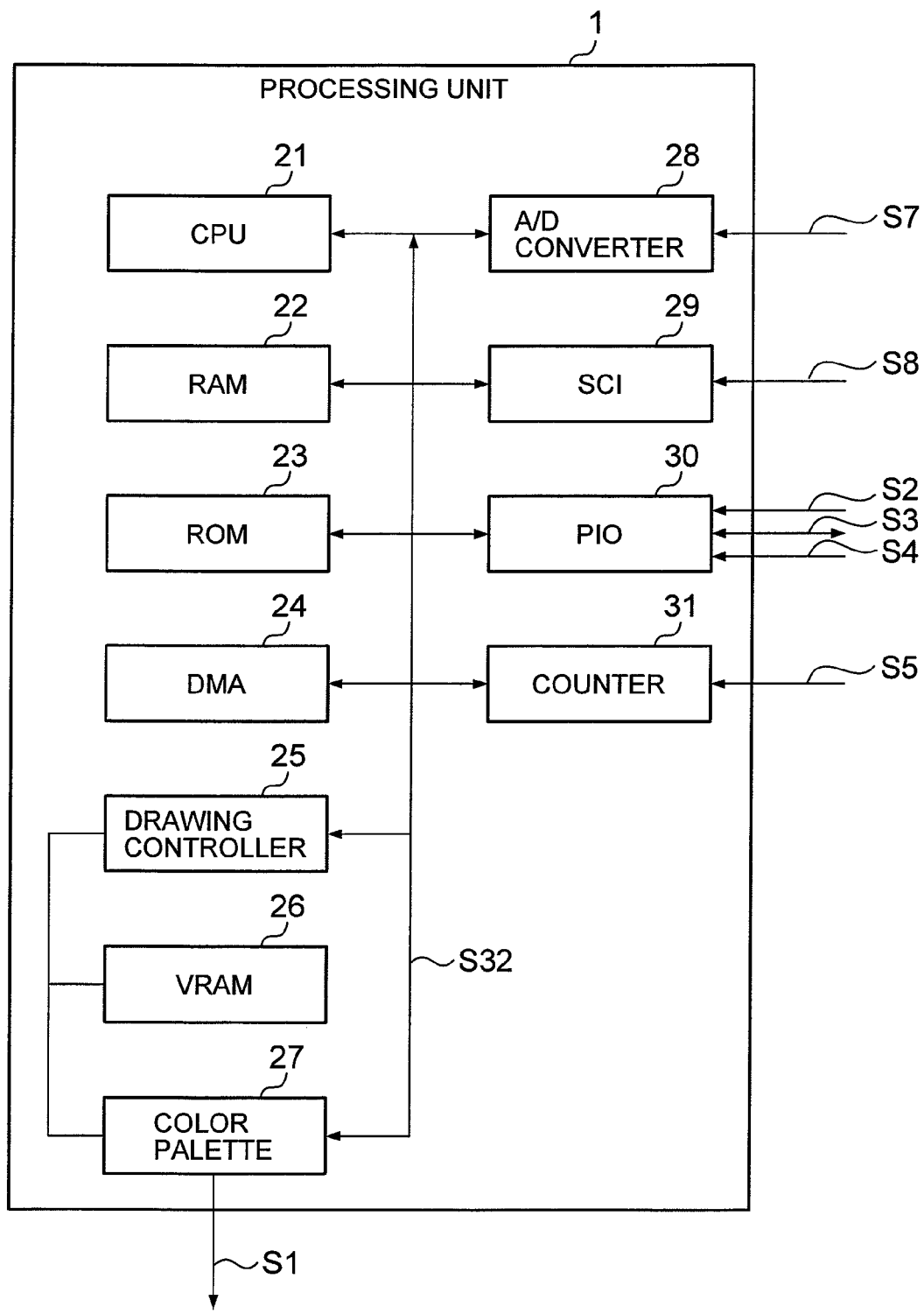
FIG. 4 is a diagram showing a hardware configuration of the processing unit 1.

FIG. 4 is a diagram showing a hardware configuration of the processing unit 1.

As shown in the figure, the processing unit 1 is implemented by connecting various devices through a bus 32. The processing unit 1 comprises: a Central Processing Unit (CPU) 21 for executing various processes such as numerical operation and control of various devices; a Random Access Memory (RAM) 22 for storing map data, operation data and the like read from the data storage unit 3; a Read Only Memory (ROM) 23 for storing programs and data; a Direct Memory Access (DMA) 24 for executing data transfer between the memories and between a memory and a device; a drawing controller 25 for executing graphics drawing and display control; a Video Random Access Memory (VRAM) 26 for buffering graphics image data; a color palette 27 for converting image data into an RGB signal; an A/D converter 28 for converting an analog signal into a digital signal; a Serial Communication Interface (SCI) 29 for converting a serial signal into a parallel signal synchronized with the bus; a Parallel Input/Output (PIO) 30 for synchronizing a parallel signal with the bus and putting the signal onto the bus; and a counter 31 for integrating a pulse signal.

Description of Operations

Next, operation of voice recognition of an address by the vehicle navigation device 100 of the above-described configuration will be described referring to FIGS. 5 to 8.

Figure 5:
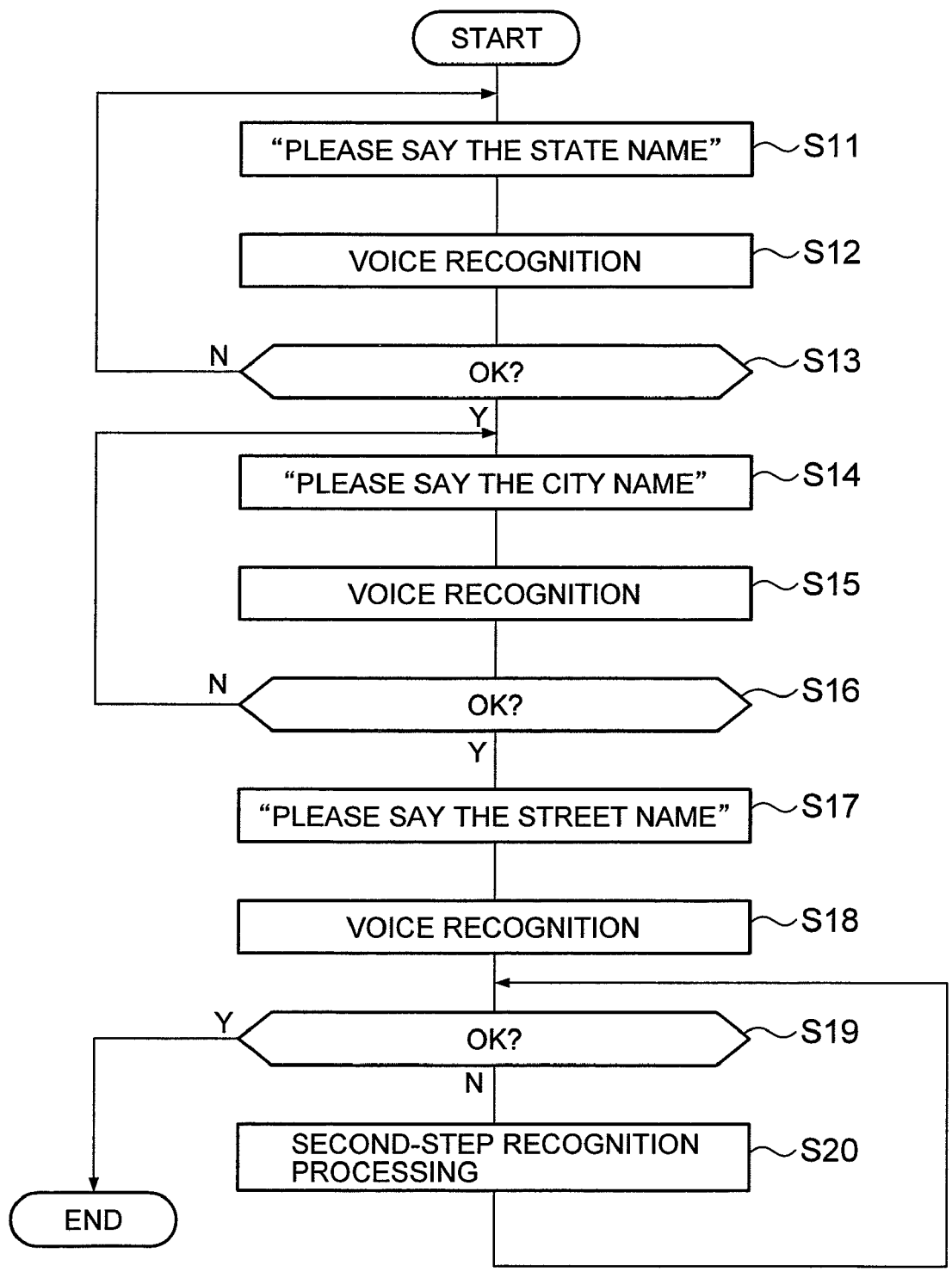
FIG. 5 is a flowchart showing voice recognition of an address.

FIG. 5 is a flowchart showing flow of voice recognition of an address.

The voice recognition unit 42 starts this flow when a request for voice input of an address is received from the user through the input unit 5.

First, the voice recognition unit 42 outputs a message such as "PLEASE SAY THE STATE" by voice through the voice input/output unit 4, prompting utterance of a state name. At that time, the voice recognition unit 42 may display this message on the display 2 as shown in the display screen (a) of FIG. 6 (S11).

Through the voice input/output unit 4, the voice recognition unit 42 acquires voice the user utterance. Then, the voice recognition unit 42 recognizes the state name from the user utterance. In detail, the voice recognition unit 42 specifies the state name that best matches the inputted voice, among the state names 301 in the address database 300. The specified state name becomes the recognition result (S12).

Figure 6:
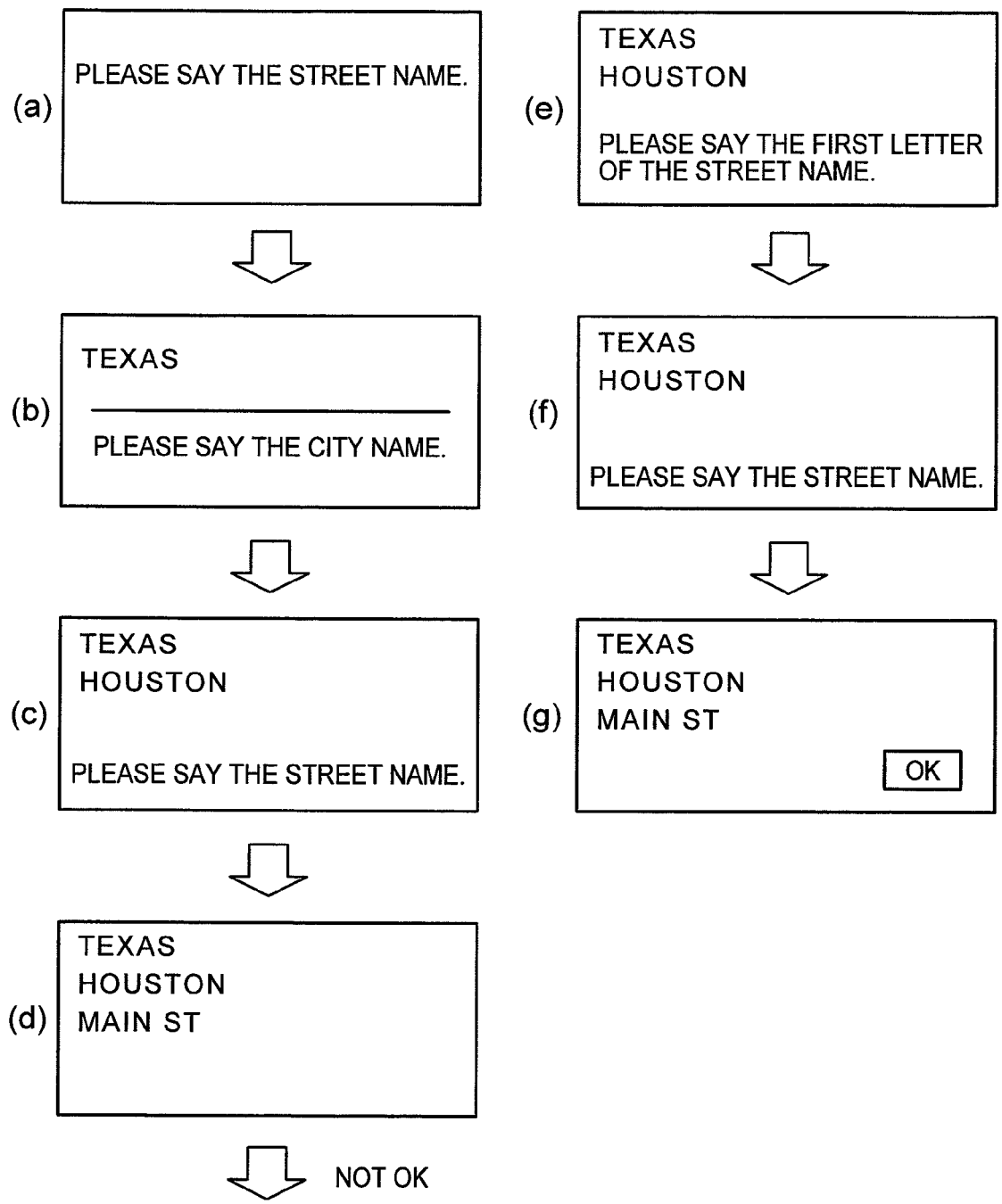
FIG. 6 is a view showing an example of display screen transition.

Next, the voice recognition unit 42 displays the recognized state name as shown in the display screen (b) of FIG. 6, and receives a selection indicating whether the recognized state name is confirmed or not, from the user (S13). When it is not confirmed (N in S13), then the flow returns to S11 to continue the processing.

On the other hand, when the recognized state name is confirmed (Y in S13), then the voice recognition unit 42 outputs a message such as "PLEASE SAY A CITY" by voice through the voice input/output unit 4, prompting utterance of a city name. At that time, the voice recognition unit 42 may display this message on the display 2 as shown in the display screen (b) of FIG. 6 (S14).

Through the voice input/output unit 4, the voice recognition unit 42 acquires user utterances. Then, the voice recognition unit 42 recognizes the city name from the user utterances. In detail, the voice recognition unit 42 refers to the address database 300 to extract city names 302 belonging to the state name 301 specified in S12. Then, the voice recognition unit 42 specifies the city name that best matches the inputted voice among the extracted city names 302. The specified city name becomes the recognition result (S15).

Next, the voice recognition unit 42 displays the specified city name as shown in the display screen (c) of FIG. 6, and receives a selection from the user indicating whether the recognized city name is confirmed or not (S16). When it is not confirmed (N in S16), then the flow returns to S14 to continue the processing.

On the other hand, when the recognized city name is confirmed (Y in S16), the voice recognition unit 42 outputs a vocal message such as "PLEASE SAY A STREET NAME" through the voice input/output unit 4, prompting utterance of the whole name (full name) of the street. At that time, the voice recognition unit 42 may display this message on the display 2 as shown in the display screen (c) of FIG. 5.

Through the voice input/output unit 4, the voice recognition unit 42 acquires the user utterance. Then, the voice recognition unit 42 recognizes the street name from the user utterance. In detail, the voice recognition unit 42 refers to the address database 300 to extract street names 303 belonging to the city name 302 specified in S15. Then, the voice recognition unit 42 specifies the street name that best matches the voice input among the extracted street names 303. The specified street name becomes the recognition result (S18).

Next, the voice recognition unit 42 displays the specified street name as shown in the display screen (d) of FIG. 6, and receives a selection from the user indicating whether the recognized street name is confirmed or not (S19). When the recognized street name is confirmed (Y in S19), input processing of the address as far as the street name is ended.

On the other hand, when it is not confirmed (N in S19), then the voice recognition unit 42 performs second-step street name recognition processing (S20).

Figure 7:
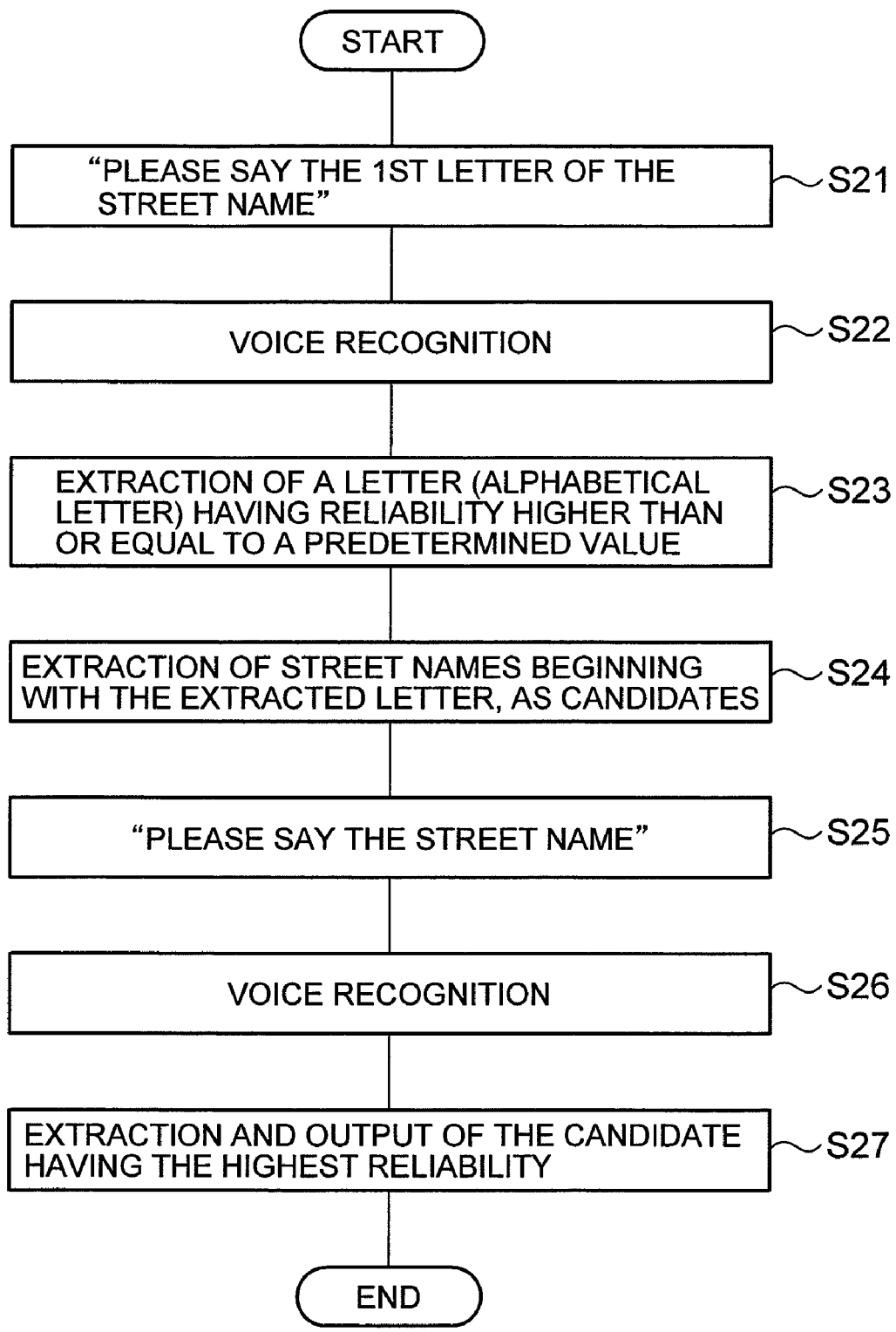
FIG. 7 is a flowchart showing processing of second-step recognition of a street name.

FIG. 7 is a flowchart showing the second-step street name recognition processing.

The voice recognition unit 42 vocally outputs a message such as "PLEASE SAY THE FIRST LETTER OF THE STREET NAME" through the voice input/output unit 4, prompting utterance of the first letter of the street name. At that time, the voice recognition unit 42 may display this message on the display 2 as shown in the display screen (e) of FIG. 6 (S21).

Through the voice input/output unit 4, the voice recognition unit 42 acquires the user utterance. Then, the voice recognition unit 42 recognizes the user utterance. In detail, as shown in FIG. 8, the voice recognition unit 42 obtains reliability 52 for each letter 51 on the basis of a correlation between the user utterance and the voice model of each alphabetical letter (S23).

Next, the voice recognition unit 42 extracts a letter whose reliability 52 is higher than or equal to a predetermined value. If there is a plurality of letters satisfying the condition, then those letters are extracted (S23).

Next, the voice recognition unit 42 refers to the address database 300 to extract street names beginning with one of the letters extracted in S23, from among the street names 303 belonging to the city name 302 specified in S14 (See FIG. 8). The extracted street names become candidates (standbys) for the street name (S24).

Next, the voice recognition unit 42 vocally outputs a message such as "PLEASE SAY THE STREET NAME" through the voice input/output unit 4, prompting utterance of the whole name of the street. At that time, the voice recognition unit 42 may display this message on the display as shown in the display screen (f) of FIG. 6 (S25).

Through the voice input/output unit 4, the voice recognition unit 42 acquires the user utterance. Then, the voice recognition unit 42 recognizes the user utterance and obtains reliability for each of the street name candidates acquired in S24 (S26).

Last, the voice recognition unit 42 extracts the street name having the highest reliability among the candidates for the street name. The voice recognition unit 42 displays the extracted street name as the recognition result on the display 2 as shown in the display screen (g) of FIG. 6.

Then the flow returns to S19 of FIG. 5, to receive a selection, from the user, indicating whether the recognized street name is confirmed or not. When a request for confirmation is received from the user (Y in S19), the voice recognition unit 42 confirms the street name. When the street name has not been confirmed (N in S19), the voice recognition unit 42 performs the second-step recognition processing S20 again.

After the street name has been confirmed, the voice recognition unit 42 may further receive the lot and house numbers of the address.

Further, the display processing unit 45 may display a map of the area around the specified address on the display 2.

Hereinabove, one embodiment of the present invention has been described.

According to the above embodiment, first the user is invited to input the whole name of the street by voice, and then recognition of the street name is tried. Only when the recognition fails, utterance of the first letter of the street name is received. Thus, the user is not requested to go through the two steps in cases where the first voice recognition of the whole name (full name) of the street is successful, such as in cases where user's utterance is clear, or only a few candidates for the street name exist, for example. In other words, a user-friendly navigation device is obtained.

Modification

The present invention is not limited to the above embodiment, and can be modified variously within the scope of the invention.

According to the above embodiment, the user is invited to input the first letter of the street name by voice in the second-step recognition processing (S20) of FIG. 5 (S21 in FIG. 7), and candidates for the street name are narrowed to ones beginning with that letter (S24). The present invention, however, is not limited to this. It is possible that, in cases where a letter on or after the second position is wrong, the user is invited to input a correct letter for that wrong letter. Then, street names beginning with a character string up to the voice-inputted letter are extracted and made candidates for a voice recognition result.

Figure 9:
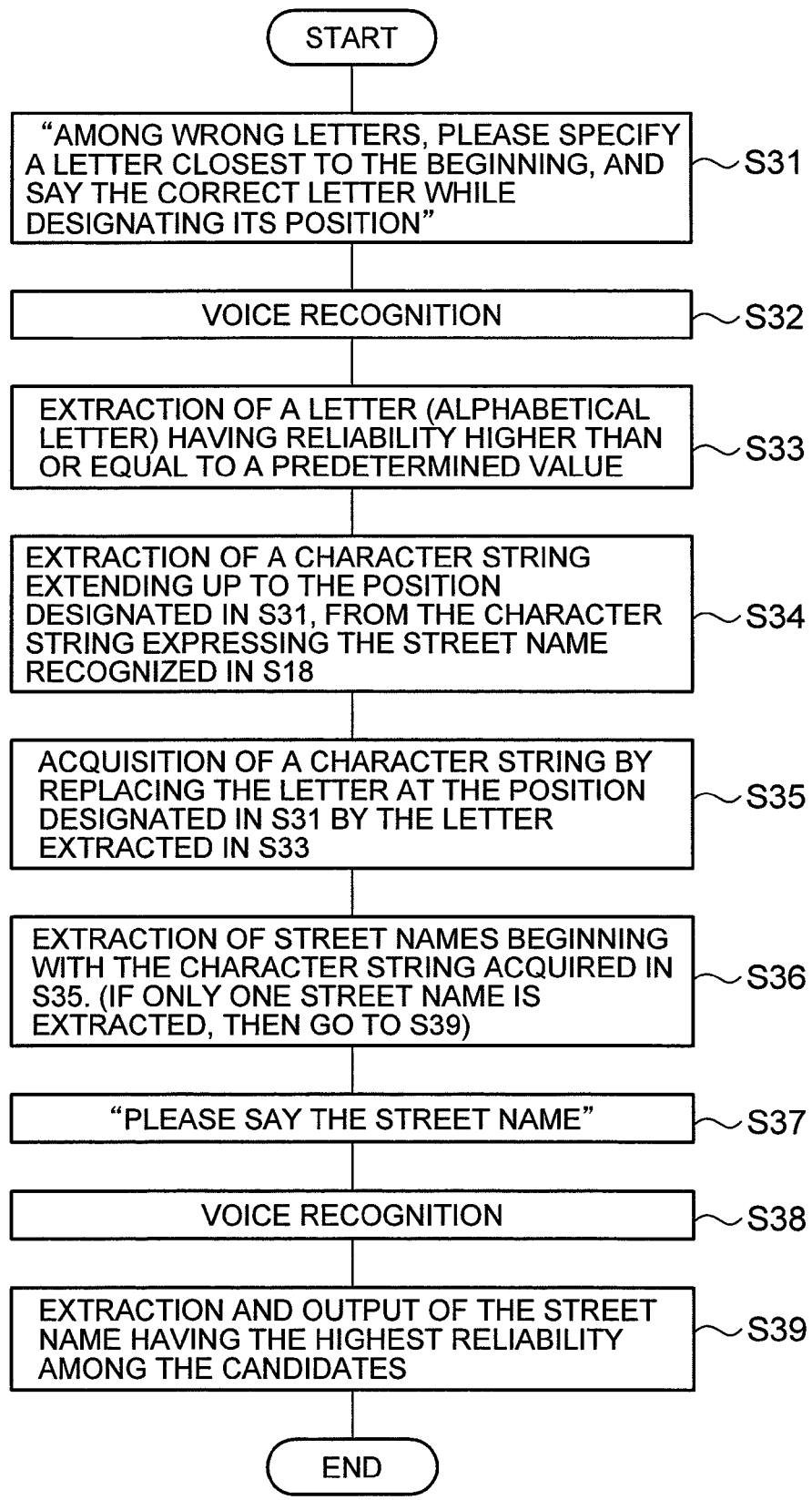
FIG. 9 is a flowchart showing processing of second-step recognition of a street name in a modified embodiment.

FIG. 9 is a flowchart showing second-step recognition processing in such cases.

The voice recognition unit 42 outputs a message such as "PLEASE SAY THE CORRECT LETTER AND ITS POSITION" by voice through the voice input/output unit 4, prompting utterance of the correct letter and its position after specifying the wrong letter closest to the beginning among the wrong letters in the character string expressing the street name specified in S18. At this time, the voice recognition unit 42 may display this message on the display 2, as shown in the display screen (e') of FIG. 10 (S31). Further, at this time, the letter numbers as indicated by the symbol P may be displayed, to understand the letter positions easily.

Here, it is assumed that the user previously knows a predetermined phrase format to be used for voice input. For example, the user says "THE 2ND LETTER TO A" in accordance with the format.

Next, through the voice input/output unit 4, the voice recognition unit 42 acquires a user utterance. Then, the position of the letter to be corrected and the correct (alphabetical) letter are recognized by voice recognition. As shown in FIG. 8 mentioned above, the recognition of the (alphabetical) letter is performed by obtaining a reliability 52 for each letter 51 on the basis of a correlation between the user utterance and the voice model of each alphabetical letter (S32).

Next, the voice recognition unit 42 extracts a letter whose reliability 52 is higher than or equal to the predetermined value. If there is a plurality of such letters, those letters are extracted (S33).

Next, the voice recognition unit 42 extracts a character string extending to the position designated by voice in S31, in the character string expressing the street name specified in S18 (FIG. 5) (S34). Further, a character string is obtained from the extracted character string by replacing the letter at the position designated in S31 by the letter extracted in S33 (S35).

For example, in cases where the street name specified in S18 is "MEIN STREET" and the user has said "THE 2ND LETTER TO A", the second letter of the character string "MEIN STREET" is replaced by "A" to acquire a character string "MA". At that time, the acquired character string may be displayed as shown in the display screen (f') of FIG. 10.

Next, the voice recognition unit 42 extracts street names beginning with the character string acquired in S35. In detail, the voice recognition unit 42 refers to the address database 300 to extract street names beginning with the character string extracted in S35, from among the street names 303 belonging to the city name specified in S14. Then the extracted street names become candidates (standbys) (S36). In cases where only one candidate exists, the flow proceeds to S39 to display the candidate.

Next, the voice recognition unit 42 outputs a message such as "PLEASE SAY THE STREET NAME" by voice through the voice input/output unit 4, prompting utterance of the whole name of the street. At that time, the voice recognition unit 42 may display this message on the display 2 as shown in the display screen (f') of FIG. 10 (S37).

Through the voice input/output unit 4, the voice recognition unit 42 acquires the user utterance. Then the voice recognition unit 42 recognizes the user utterance to obtain reliability for each street name candidate acquired in S36 (S38).

Last, the voice recognition unit 42 extracts the street name having the highest reliability among the candidates for the street name. Then the extracted street name is displayed as the recognition result on the display 2, as shown in the display screen (g') of FIG. 10 (S39).

Hereinabove, the second-step recognition processing S20 according to a modified example has been described. According to this embodiment, in cases where letters in the second and/or following positions are different from the corresponding letters in the street name intended by the user, only the letter closest to the beginning is corrected among the wrong letters, so that street names beginning with the character string extending up to the corrected letter are acquired as voice recognition candidates for the street name. Thus, candidates for the street name can be efficiently narrowed down.

The above embodiments have been described taking examples where the present invention is applied to vehicle navigation devices. The present invention, however, can be applied to any other device that performs voice recognition of an address.

The invention claimed is:

1. A navigation device, comprising:
a storage means, which stores street names;
a first street name receiving means, which receives voice input of a whole street name;
a first street name specifying means, which specifies a street name that best matches the voice received by the first street name receiving means among the street names stored in the storage means;
a confirmation means, which receives confirmation of the street name specified by the first street name specifying means;
a letter receiving means, which receives voice input of at least one letter from a character string expressing the street name specified by the first street name specifying means, when the confirmation means has not received confirmation of the specified street name;
a letter specifying means, which recognizes the voice input received by the letter receiving means, so as to specify a letter;
an extraction means, which extracts candidate street names from the street names stored in the storage means, by using the letter specified by the letter specifying means;
a second street name receiving means, which receives voice input of the whole street name after the letter receiving means receives the voice input;
a second street name specifying means, which specifies a street name that best matches the voice input received by the second street name receiving means, from among the street names extracted by the extraction means; and
an output means, which outputs the street name specified by the second street name specifying means.

2. A navigation device, comprising:
a storage means, which stores street names;
a first street name receiving means, which receives voice input of a whole street name;
a first street name specifying means, which specifies a street name that best matches the voice input received by the first street name receiving means, from among the street names stored in the storage means;
a confirmation means, which receives confirmation of the street name specified by the first street name specifying means;
a letter receiving means, which receives voice input of a first letter of a street name when the confirmation means has not received confirmation of the specified street name;
a letter specifying means, which recognizes the voice input received by the letter receiving means, so as to specify a letter;
an extraction means, which extracts street names beginning with the letter specified by the letter specifying means, from the street names stored in the storage means;
a second street name receiving means, which receives voice input of the whole street name after the letter receiving means receives the voice input;
a second street name specifying means, which specifies a street name that best matches the voice input received by the second street name receiving means from among the street names extracted by the extraction means; and
an output means, which outputs the street name specified by the second street name specifying means.

3. A navigation device, comprising:
a storage means, which stores street names by state name and city name;
a state name receiving means, which receives voice input of a state name;
a state name specifying means, which recognizes the voice input received by the state name receiving means, so as to specify a state name;
a city name receiving means, which receives voice input of a city name;
a city name specifying means, which specifies a city name that belongs to the state name specified by the state name specifying means and best matches the voice input received by the city name receiving means;
a first street name receiving means, which receives voice input of a street name;
a first street name specifying means, which specifies a street name that belongs to the city name specified by the city name specifying means and best matches the voice input received by the first street name receiving means among the street names stored in the storage means;
a confirmation receiving means, which receives confirmation of the street name specified by the first street name specifying means;
a letter receiving means, which receives voice input of a first letter of a street name when the confirmation receiving means has not received confirmation of the specified street name;
a letter specifying means, which recognizes the voice input received by the letter receiving means, so as to specify a letter;
a street name extraction means, which extracts street names that belong to the city name specified by the city name specifying means and begin with the letter specified by the letter specifying means, among the street names stored in the storage means;
a second street name receiving means, which receives voice input of the whole street name after the letter receiving means receives the voice input;
a second street name specifying means, which specifies a street name that best matches the voice input received by the second street name receiving means, from among the street names extracted by the street name extraction means; and an output means, which outputs the street name specified by the second street name specifying means.

4. A navigation device, comprising:

a storage means, which stores street names;

a first street name receiving means, which receives voice input of a whole street name;

a first street name specifying means, which specifies a street name that best matches the voice input received by the first street name receiving means, from among the street names stored in the storage means;

a confirmation means, which receives confirmation of the street name specified by the first street name specifying means;

a letter receiving means, which receives, by voice input, a correct letter to replace a wrong letter in a character string expressing the street name specified by the first street name specifying means, together with a position of the wrong letter in the character string, when the confirmation means has not received confirmation of the specified street name;

a letter specifying means, which recognizes the voice input received by the letter receiving means, so as to specify the correct letter;

a character string acquisition means, which acquires, from a character string that expresses the street name specified by the first street name specifying means, a character string extending as far as the correct letter in a character string resulting from replacing the wrong letter by the correct letter;

an extraction means, which extracts street names beginning with the acquired character string, from among the street names stored in the storage means;

a second street name receiving means, which receives voice input of the whole street name after the letter receiving means receives the voice input;

a second street name specifying means, which specifies a street name that best matches the voice input received by the second street name receiving means from among the street names extracted by the extraction means; and an output means, which outputs the street name specified by the second street name specifying means.

5. A navigation device of claim 1, wherein:

the letter specifying means obtains reliability for each alphabetical letter from the voice input received by the letter receiving means and extracts a letter having reliability higher than or equal to a predetermined value.

6. An address input method for a navigation device, wherein the navigation device has a storage means which stores street names, the address input method comprising:

a first street name receiving step, in which voice input of a whole street name is received;

a first street name specifying step, in which a street name that best matches the voice input received in the first street name receiving step is specified, from among the street names stored in the storage means;

a confirmation step, in which confirmation of the street name specified in the first street name specifying step is received;

a letter receiving step, in which voice input of at least one letter of a character string expressing the street name specified by the first street name specifying step is received, when confirmation of the specified street name has not been received in the confirmation step;

a letter specifying step, in which the voice input received in the letter receiving step is recognized so as to specify a letter;

an extraction step, in which candidate street names are extracted from the street names stored in the storage means, by using the letter specified in the letter specifying step;

a second street name receiving step, in which voice input of the whole street name is received after the voice input is received in the letter receiving step;

a second street name specifying step, in which a street name that best matches the voice input received in the second street name receiving step, from among the street names extracted in the extraction step; and an output step, in which the street name specified in the second street name specifying step is outputted.

* * * * *